United States Patent [19]

Leister

[11] Patent Number: 4,522,620
[45] Date of Patent: Jun. 11, 1985

[54] METHOD AND APPARATUS FOR MEASURING THE QUANTITY OF SOLID MATERIAL IN A CENTRIFUGE CYLINDER

[75] Inventor: Peter Leister, Waldbronn, Fed. Rep. of Germany

[73] Assignee: Deutsche Gesellschaft, Fed. Rep. of Germany

[21] Appl. No.: 549,999

[22] Filed: Nov. 8, 1983

[30] Foreign Application Priority Data

Nov. 11, 1982 [DE] Fed. Rep. of Germany ....... 3241624

[51] Int. Cl.$^3$ ............................................. B04B 13/00
[52] U.S. Cl. ...................................... 494/10; 494/37; 210/144
[58] Field of Search ..................... 55/270; 73/580, 650, 73/862.59, DIG. 1; 210/144, 145, 148; 494/1, 7, 8, 9, 10, 37

[56] References Cited

U.S. PATENT DOCUMENTS

| | | | |
|---|---|---|---|
| 3,354,698 | 11/1967 | Christmann | 73/580 |
| 3,851,819 | 12/1974 | Tadokoro | 494/8 |
| 4,070,290 | 1/1978 | Crosby | 494/10 |
| 4,267,734 | 5/1981 | Shima | 73/650 |

FOREIGN PATENT DOCUMENTS 1918294 10/1970 Fed. Rep. of Germany.
496479 11/1970 Switzerland.

Primary Examiner—Robert W. Jenkins
Assistant Examiner—Arthur D. Dahlberg
Attorney, Agent, or Firm—Allegretti, Newitt, Witcoff & McAndrews, Ltd.

[57] ABSTRACT

Accurate, contact-free measurement, outside the processing area, of the quantity of solid material in a centrifuge cylinder used in reprocessing nuclear fuel solutions. A mechanical vibration system consisting of the centrifuge cylinder and of a supplemental mass attached to the cylinder produces torsional vibrations by, for example, increasing or decreasing the speed of the cylinder drive shaft. The frequency of the vibrations reflect the quantity of solid material in the cylinder. A sensor senses the frequency of the vibrations and sends signals to a means for computing the quantity of the load from the frequency.

13 Claims, 3 Drawing Figures

METHOD AND APPARATUS FOR MEASURING THE QUANTITY OF SOLID MATERIAL IN A CENTRIFUGE CYLINDER

BACKGROUND OF INVENTION

The invention concerns a measuring process and device for determining the solid materials load of a centrifuge cylinder, particularly for use in reprocessing installations, for separation of non-soluble solid particles of fuel solutions.

In reprocessing installations, it is necessary for operational planning and for purposes of nuclear fuels monitoring, to monitor chronogically the quantity of solid materials which exist in the centrifuge cylinder. The monitoring and determination of the quantity of solid materials should be possible both while the centrifuge is operating and while it is stationary.

PRIOR ART

In general, various processes are already known for determining the solid materials load of a centrifuge.

In one process, the torsion of the shaft of the centrifuge cylinder is determined with the aid of strain sensors positioned on the shaft. The magnitude of the torsion is an index for the solid materials load.

In another process, the elastic deformation of the centrifuge cylinder, which arises through the centrifugal forces acting on the cylinder casing, is determined with the aid of strain sensors mounted on the cylinder under steady rotational speed. The magnitude of the elastic deformation is an index for the solid materials load.

Determining the solid materials load by measuring the run-up or run-down time of the cylinder, from 0 rpm to operating speed, or the inverse, or simply within a specific speed range, is another known process.

The measurement of the current consumption of the drive motor for the centrifuge is also consulted to determine the solid materials load in the centrifuge cylinder.

A very simple process which is also used occasionally consists of measuring the weight of the whole centrifuge before and after centrifuging. This, for example, can take place by providing suitable force sensors in the base of the centrifuge. The difference in the results measured directly indicates the solid materials load.

These known processes have various drawbacks. The measuring of torsion with the aid of strain sensors yields information about the solid materials load only during the acceleration phase. The measurement of the elastic deformation of the centrifuge cylinder at steady rotational speed by means of strain sensors does, to be sure, permit continuous measurement or monitoring of the solid materials load. However, the process does have a drawback, namely that the measurement does not take place free of contact. Moreover, when scanning the elastic deformation of the centrifuge cylinder, the strain sensors must be accommodated in the processing area in the reprocessing installation, which is particularly disadvantageous when measuring radioactive materials. Neither process allows the solid materials load to be measured while the centrifuge is stationary. Moreover, neither one of these processes is particularly accurate.

The measurement of the run-up or run-down time of the cylinder, or the measurement of the current consumption of the drive device of the centrifuge, represent a rather inaccurate process and are, moreover, not possible while the cylinder is at rest. The direct measurement of the weight of the centrifuge is relatively inaccurate, since the weight of the centrifuge is large in comparison with the solid materials load.

THE INVENTION

The object of the invention lies in supplying a measuring process and device for determining the solid materials load of a centrifuge cylinder, in which the drawbacks of the known processes described above are avoided, and, in particular, to ensure that there is made possible an accurate measurement, conducted free of contact, outside the processing area, and with inexpensive measurement equipment. Furthermore, the measuring process and device must be so formed that a measurement of the solid materials load is possible in a safe and continuous manner, both while the centrifuge is at rest and while it is in operation.

The objects are achieved in accordance with the invention by measuring the frequency of the torsional vibrations produced through momentary alteration of the rotational speed of the centrifuge cylinder. The process ensures high accuracy in the measurements, and can be carried out relatively simply. The measuring device can easily be used outside the processing area of a reprocessing installation. The measuring process as specified by the invention, and the measuring device as specified by the invention, are also very flexible as to their use.

THE DRAWINGS

The invention is illustrated in greater detail through the following description when read in conjunction with the appended drawings, in which FIG. 1 is a schematic elevational representation of a preferred example of the invention;

FIG. 2 shows two modifications of the form of the invention shown in FIG. 1; and FIG. 3 is a further form of apparatus for executing the invention, also shown schematically.

Identical components are referred to in the figures of the drawings by identical reference symbols.

DETAILED DESCRIPTION

Figure 1:
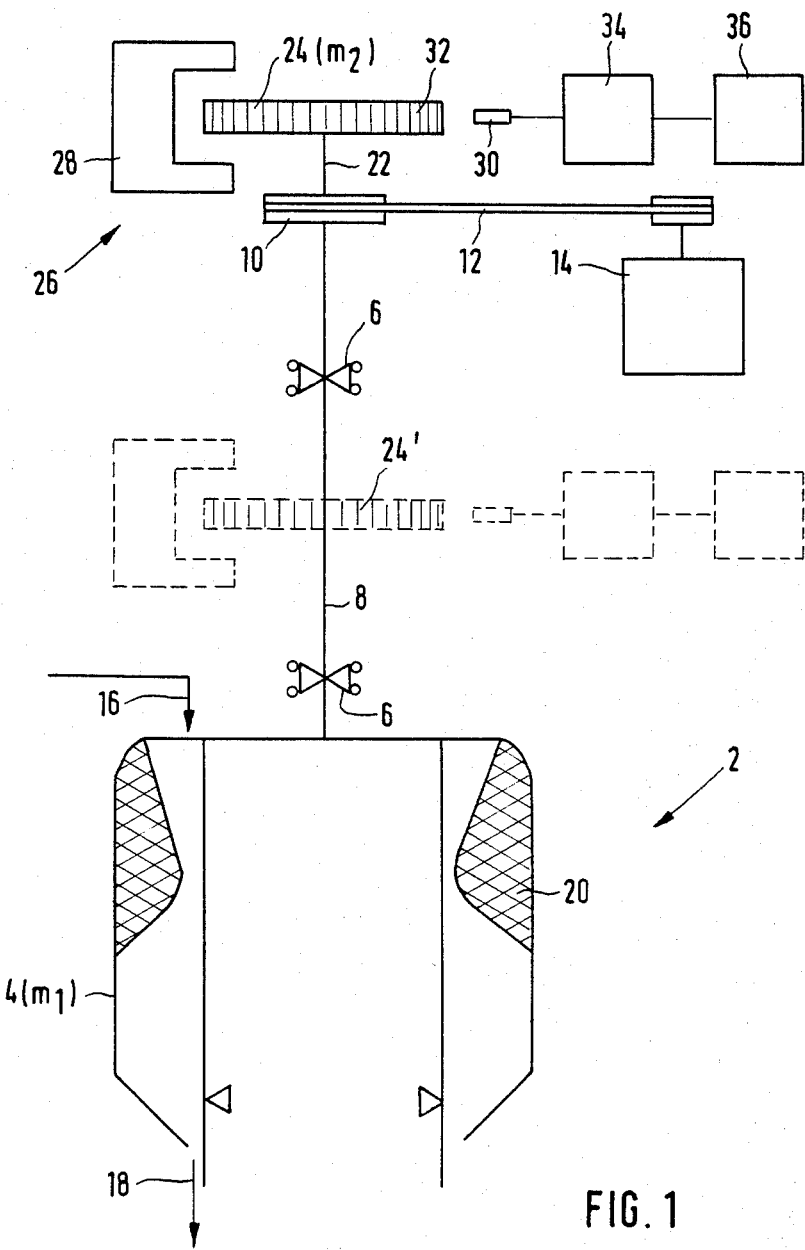

The drawings show a centrifuge 2 comprising a centrifuge cylinder 4, driven by an electrical motor 14, through V-belt 12, pulley 10, and a drive shaft 8 supported by bearings 6.

The centrifuge cylinder 4 is positioned in suspension, as is suitable for use in reprocessing installations for nuclear fuels. In general, every other manner of disposition (upright, horizontal or inclined) is possible.

The centrifuge cylinder has an inlet 16 and an outlet 18. This serves in reprocessing installations particularly to separate solid particles from radioactive fuel solutions. With the rotation of the centrifuge cylinder 4, the solid particles settle on the outer wall of the centrifuge cylinder and form the solid materials load 20, referred to as cakes.

For purposes of this invention, it is necessary only to determine the weight of the solid materials load. For this, an additional mass ($m_2$), in the form of a cage armature 24, for example, is mounted at the upper end 22 of the drive shaft 8. The cage armature 24 is part of an electrical apparatus 26 having a stator coil 28.

The centrifuge cylinder 4 with a mass ($m_1$), forms a mechanical "double-mass" vibration system with the cage armature 24 as the second mass ($m_2$), which is flexibly connected with the mass ($m_1$) by means of the drive shaft 8.

Through the stator coil 28 of the electrical apparatus 26, an electromotive force (e.m.f.) can be momentarily produced in the cage armature 24 to change the speed of rotation of the shaft. Thus, a torsion momentum is temporarily imparted to the vibration system ($m_1$, $m_2$), and thereby transferred into torsion vibrational mode. The frequency of these vibrations is dependent on the supplemental mass ($m_2$) and on the centrifuge cylinder mass ($m_1$), and the changes with the alteration of these masses, thus being dependent on the solid materials load of the centrifuge cylinder 4. Through the frequency measurement of the torsion vibrations produced, it is possible to determine the magnitude of the solid materials load 20.

The measurement of frequency occurs by means of an electromagnetic or optical sensor, 30 which scans the markings 32, which are set on the periphery of supplementary mass ($m_2$), which is the cage armature 24. The frequency of the sensor output signal is determined and evaluated by means of a known apparatus 34. The results of the measurement, or the solids materials load determined, are then represented on a suitable indicator 36.

The cage armature 24 and associated elements need not be mounted on the end of the drive shaft 8. It can be moved on the shaft closer to the cylinder 4 as indicated at 24′ in FIG. 1.

Figure 2:
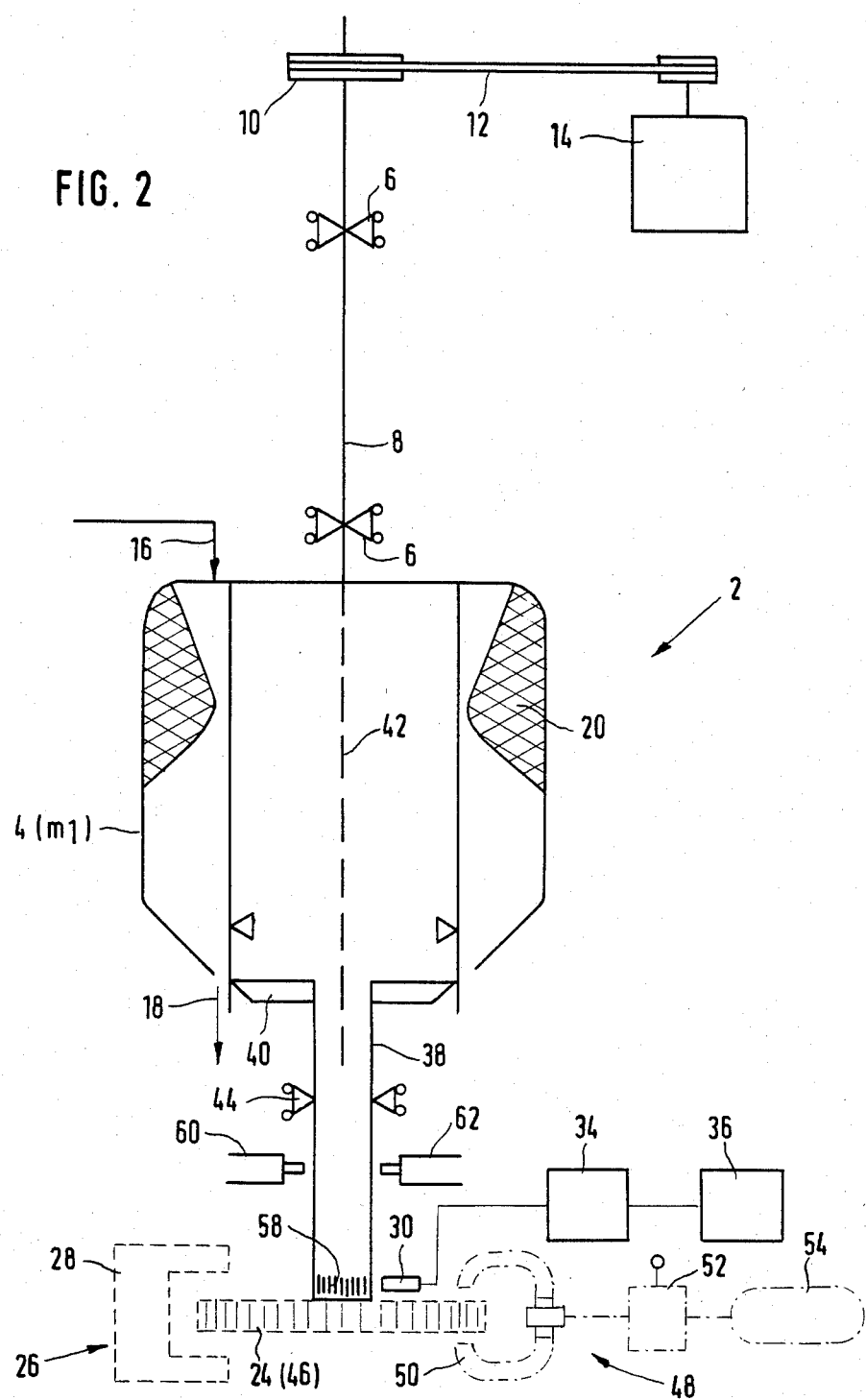

The supplemental mass ($m_2$), for example, in the form of the cage armature, can also be mounted on a supplementary shaft or axle 38, which, relative to the centrifuge cylinder 4, is opposite the drive shaft 8, as shown in FIG. 2. The supplementary shaft of axle 38 can be positioned above spaced bars 40 in the area of the outlet 18 of the cylinder 4, or formed as an extension of the drive shaft. The supplemental shaft of axle 38 can be additionally supported by bearing 44.

Figure 3:
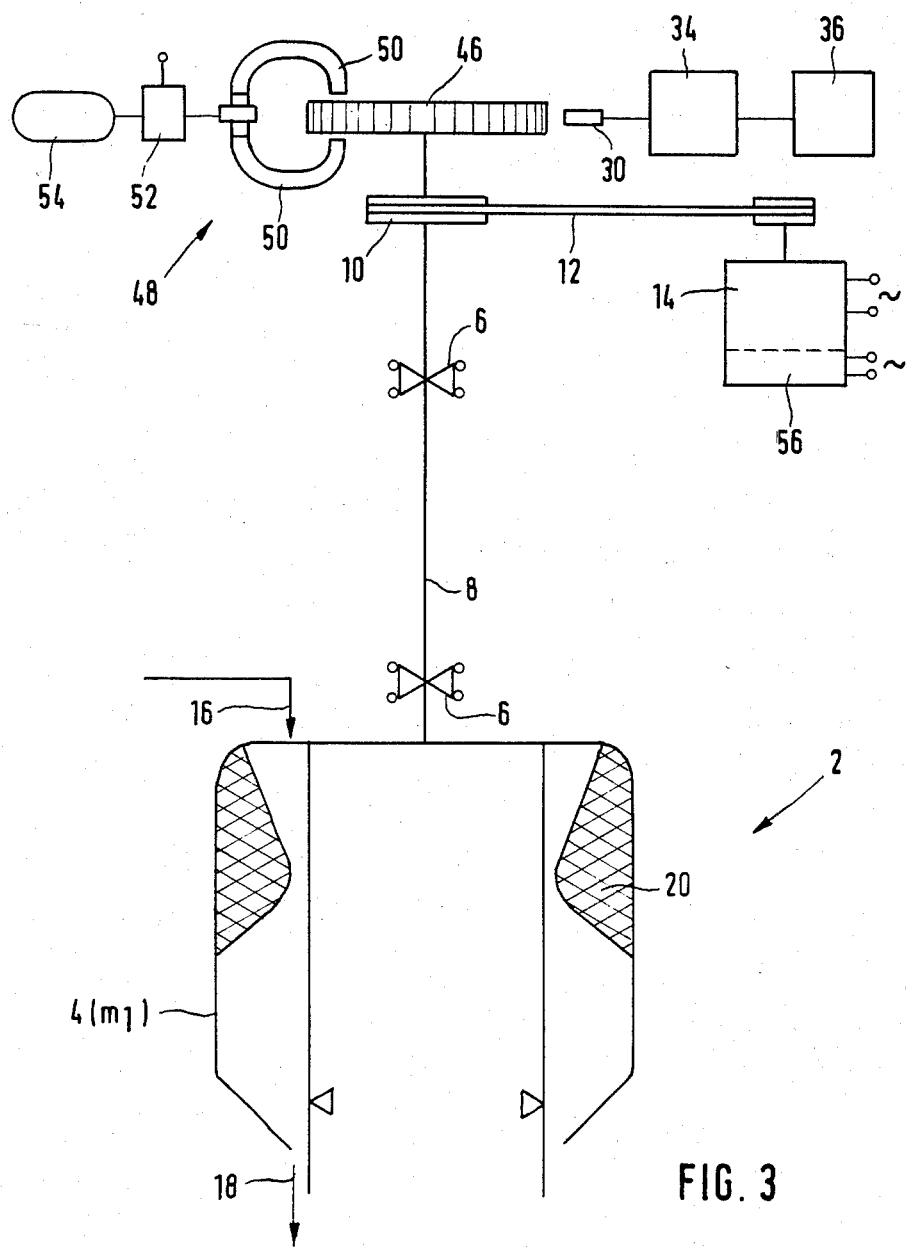

As shown in FIGS. 2 and 3, the supplemental mass ($m_2$) with the markings 32 can also be easily formed as a disk 46. The torsion momentum for producing torsion vibrations can then, for example, be produced by means of a braking device 48, FIG. 2. The brake blocks 50 can be activated by a pressure medium with the aid of a valve 52 and a source of pressure medium 54, or simply applied mechanically to the disk 46.

As shown in FIG. 3, the production of the torsion momentum is also possible by means of the drive motor 14 of the centrifuge cylinder 4, since a separately chargeable supplemental coil 56 is provided there, by means of which the rotational momentum of the motor 14 can be momentarily influenced.

In certain circumstances, the supplemental mass can also be dispensed with. The torsion vibrations system then consists of the centrifuge cylinder 4 and of the drive shaft 8, or of the supplemental shaft or axle 38, upon which markings 58 to be scanned are placed, FIG. 2. The production of torsion momentum can take place here, for example, mechanically, through momentary application of two brake elements 60, 62. The scanning of the markings 58 and the evaluation of the supported sensor occur as described above.

Apart from the production and evaluation of torsional vibrations, preferred at present for reasons of economy, longitudinal and/or bending vibrations can also be produced and evaluated.

I claim:

1. A method for measuring the quantity of a solid material load in the cylinder of a centrifuge, particularly for use in reprocessing nuclear fuel solutions, said centrifuge having a drive shaft which comprises
    (a) providing a mass supplementing the mass of said centrifuge and connecting to the drive shaft of said centrifuge,
    (b) temporarily imparting natural torsional vibrations to said centrifuge, drive shaft, and supplemental mass,
        said torsional vibrations being produced by an electromagnetic field surrounding a cage armature rotation with said drive shaft, the frequency of said vibrations depending upon the quantity of the load,
    (c) measuring the frequency of said natural vibrations, and
    (d) converting the frequency into quantity units.

2. A device for determining the quantity of a solid material load in the cylinder of a centrifuge comprising
    a mechanical vibration system consisting of said centrifuge cylinder, drive shaft for said cylinder, and a supplemental mass connected to said cylinder,
    said supplemental mass being an armature fixed to said drive shaft, means for temporarily imparting natural torsional vibrations to said vibration system comprisng a stator coil surrounding said armature, and
    means for measuring the natural vibrational frequency and computing the quantity of the load.

3. The device of claim 2 in which said armature has circumferential markings, and said measuring means comprises a sensor for scanning the markings, thus sensing the frequency of torsional vibrations, and computing means for receiving the output of said sensor and determining the quantity of the load.

4. The device of claim 3 in which said sensor is an electromagnetic originator of rotation.

5. The device of claim 3 in which the cycle of the output signals of said sensor is measured by said measuring means and the frequency alterations of the naural vibrations of said vibration system are calculated by said computing means.

6. A device for determining the quantity of a solid material load in the cylinder of a centrifuge comprising a mechanical vibration system consisting of said centrifuge cylinder, drive shaft for said cylinder, and a supplemental mass connected to said cylinder, means for temporarily importing natural torsional vibrations to said vibration system comprising an electric motor connected to said drive shaft and a separately chargeable coil which provides an electrical field for the armature of said motor, and means for measuring the natural vibrational frequency and computing the quantity of the load.

7. A method for measuring the quantity of a solid material load in the cylinder of a centrifuge, said centrifuge being directly connected to a drive shaft driven directly by a motor which comprises
    (a) providing a mass, supplementing the mass of said centrifuge, fixed to said drive shaft,
    (b) suddenly imparting momentary natural torsional vibrations to said drive shaft and said centrifuge and supplemental mass connected thereto,
    (c) measuring the frequency of said torsional vibrations, and
    (d) converting the frequency into quantity units.

8. The method of claim 7 in which step (b) is performed by increasing the speed of said drive shaft.

9. The method of claim 7 in which step (b) is performed by braking said drive shaft.

10. A device for determining the quantity of a solid material load in the cylinder of a centrifuge comprising
 (a) a mechanical vibrations system consisting of said centrifuge cylinder, a drive shaft connecting directly to said cylinder, and a supplemental mass fixed to said drive shaft,
 (b) means for suddenly imparting momentary natural torsional vibrations to said drive shaft, and
 (c) means for measuring the vibrational frequency and computing the quantity of the load.

11. The device of claim 10 in which means (b) is a brake.

12. The device of claim 10 in which said supplemental mass is a drive means for said cylinder, functionally connected to said drive shaft.

13. The device of claim 10 in which said supplemental mass is a supplemental shaft connected in a torsionally secure manner with said cylinder mounted on the end of said cylinder opposite said drive shaft.

* * * * *